Figure 1:
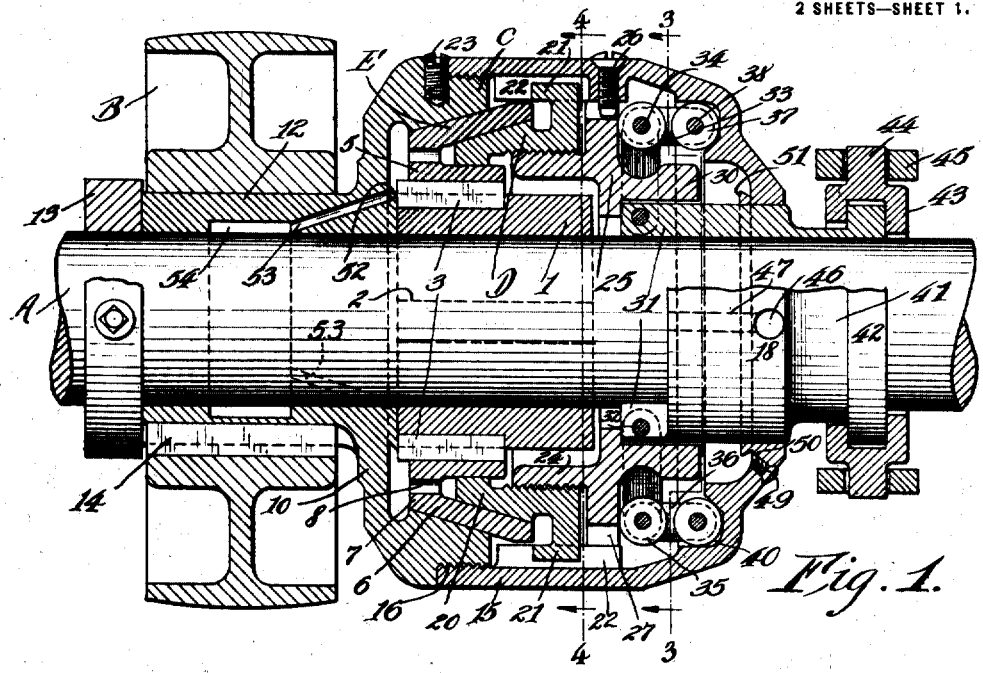

W. A. HEANEY.
CLUTCH.
APPLICATION FILED JUNE 21, 1915.

1,248,109.

Patented Nov. 27, 1917.
2 SHEETS—SHEET 1.

INVENTOR,
William A. Heaney
BY Hill, Smith, Brock & West
ATT'YS.

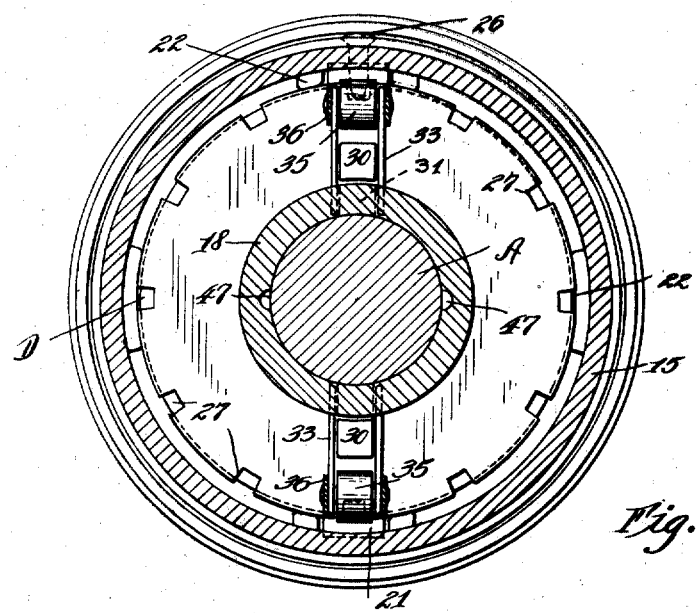
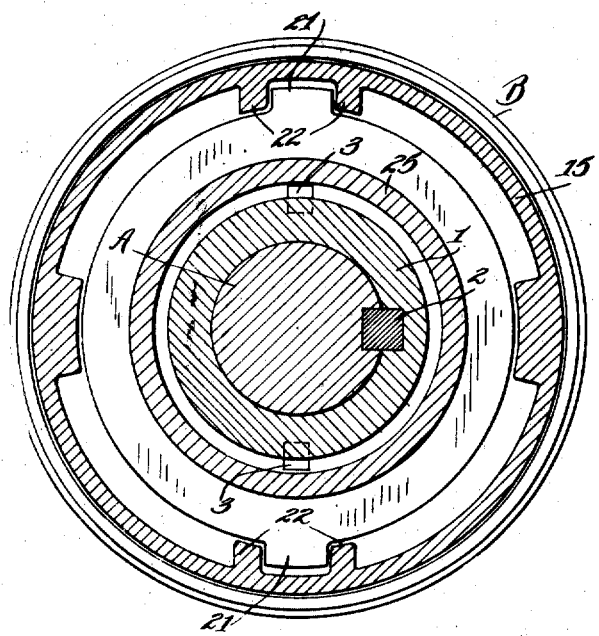
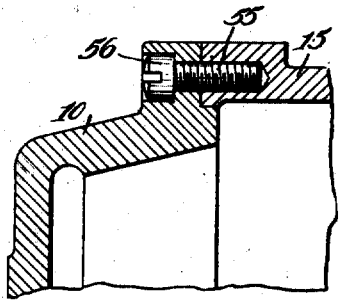

UNITED STATES PATENT OFFICE.

WILLIAM A. HEANEY, OF AKRON, OHIO, ASSIGNOR TO WILLIAM F. WARDEN, OF AKRON, OHIO.

CLUTCH.

1,248,109.  Specification of Letters Patent.  Patented Nov. 27, 1917.

Application filed June 21, 1915. Serial No. 35,227.

*To all whom it may concern:*

Be it known that I, WILLIAM A. HEANEY, a citizen of the United States, residing at Akron, in the county of Summit and State of Ohio, have invented a certain new and useful Improvement in Clutches, of which the following is a full, clear, and exact description, reference being had to the accompanying drawings.

This invention relates to clutches, especially to what are known as multi-cone clutches, and more particularly to the so-called "oil-clutches" of this nature—the term indicating that the internal working parts are continually bathed in oil.

The clutch herein disclosed is especially adapted for use upon continually running line shafts, the clutches, in such instances, having secured to them pulleys, gears, or other means of transmitting power from the shaft to apparatus or machines wherewith the clutches are associated. It will be pointed out during the course of the following description however that, while the foregoing is the preferred arrangement, the clutch is adaptable to practically all conditions under which clutches of prevailing types are capable of use.

The objects of the invention are to provide a clutch of the above character that is compact, yet very powerful; that is substantial of construction, and very durable; that may be conveniently lubricated, and that operates noiselessly; that is particularly clean, considering the fact that it is an oil clutch, provisions being made for preventing egress of oil to the exterior of the clutch, from where it might be thrown by centrifugal action; to provide a clutch of the aforesaid nature that can be very easily operated, and with a comparatively slight movement of the shifting apparatus; to provide a clutch of the character aforesaid wherein the clutch members are positively locked or blocked against separation, when the clutch is in effective condition, and are positively and materially separated upon a disengagement of the clutch members, wherein the clutch members are caused to very gradually engage, thereby to prevent undue shock to the driven element, when the clutch is operated.

As above pointed out, when the clutch members are disengaged, they are materially separated so that a space exists between their adjacent faces; and, by reason of the fact that the parts are continually bathed in oil, a film of oil forms between the clutch faces and prevents the clutch from becoming effective too suddenly, which would impart a jar or shock to the driven element. The thorough lubrication of the engaging surfaces of the clutch members also insures an immediate disengagement of said members when the clutch is thrown out. And furthermore, this feature is responsible for the noiseless operation of the clutch.

A still further object is to provide a clutch which, when installed according to the preferred arrangement already described, possesses no outside or exposed parts which are rotating when the driven element is quiet.

A further object of the invention is to provide a multi-cone clutch wherein the engagement of the cones is successively effected, thereby further insuring the gradual operation of the clutch. Another object of the invention is to provide a clutch of the aforesaid character that may be very easily disassembled for the purposes of inspection and repair. A still further and very important object of my invention, and one which will become clear from the following detailed description, is to provide "throw in" or clutch actuating mechanism the pressure of which is evenly distributed throughout the circumference of the clutch cones, thereby preventing distortion, and insuring even wearing of the parts. Furthermore, the clutch is so designed that, when mounted according to my preferred method, the "throw in" mechanism (which it will be explained, operates radially and is effective when farthest from the rotating axis of the clutch) will be idle when the driven element is at rest, wherefore it is not subjected to centrifugal action that would tend to throw it into effective position; and, reversely, when the clutch is in operation, the influence of centrifugal action is exerted upon the "throw" mechanism to retain it in effective position.

In the accompanying drawings I have illustrated an embodiment of my invention wherein the foregoing objects are attained, and while I will proceed to describe such embodiment in detail, I wish to be understood as not limiting myself to the structural details thereof, further than is required by the terms of the annexed claims and is rendered necessary by the prior state of the art.

Figure 2:
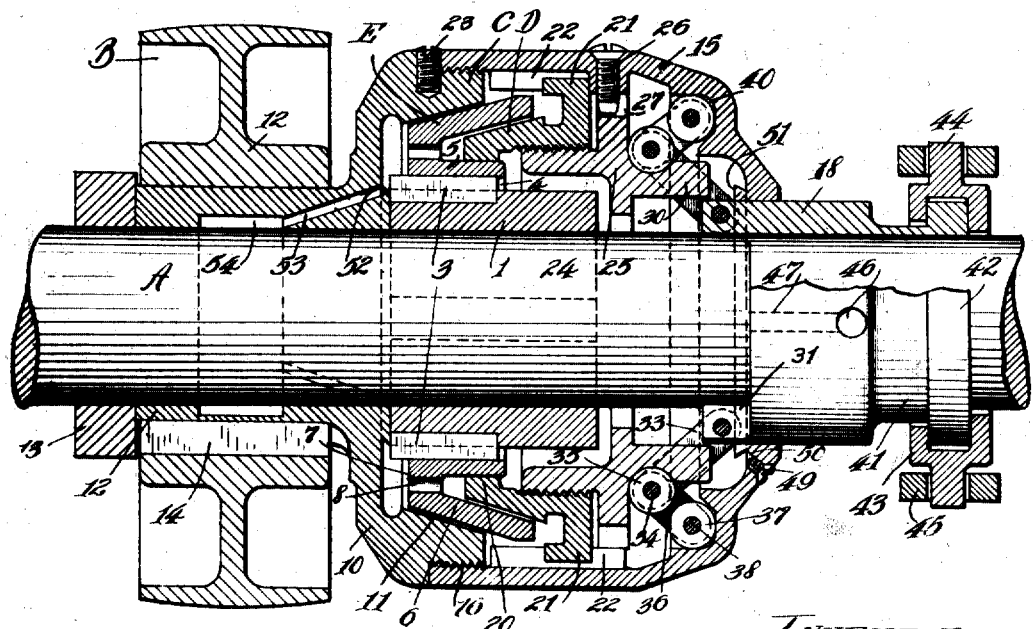

In the drawings, Figure 1 is a central longitudinal section through the clutch of my invention, the same being shown in effective condition; Fig. 2 is a similar view of the clutch in ineffective condition; Fig. 3 is a transverse section through the clutch, on the line 3—3 of Fig. 1; Fig. 4 is a similar sectional view through the clutch on the line 4—4 of said Fig. 1; and Fig. 5 is a sectional detail of a modified form of casing that is used in connection with larger and more powerful clutches than the one shown in the preceding figures.

In taking up a detail description of the invention, I will first introduce and generally describe the more essential elements of the clutch and associated parts, by the use of reference letters, and follow with a more detailed description of each element, referring to the parts thereof by the use of reference numerals.

A represents one and B the other of a driving and driven element that are adapted to be operatively connected through my improved clutch which comprises, generally, the outer clutch member C, the inner clutch member D, and the intermediate clutch member E, the latter being locked against angular movement upon the element A, while the members C and D are held against rotation with respect to each other, and to the element B.

The element A is shown as a shaft (as, for instance, a line shaft) and will therefore, be referred to hereinafter as such; and the element B is shown as a pulley that may be operatively connected through a belt with the apparatus or machine, wherewith the clutch is associated. It will be assumed, furthermore, for the purpose of description and also because it is my preferred method of mounting and using the clutch, that the shaft A is the driving element, and the pulley B the driven element.

A supporting collar 1, is secured to the shaft A by means of a key 2, and a pair of feathers 3 are set within the periphery of the collar at diametrically opposite points, for coöperation with splines or key ways 4 that are formed in the hub 5 of the intermediate clutch member E. This clutch member further comprises a frusto conical shell 6, the smaller end of which is connected to the adjacent end of the hub 5, by means of an annular wall 7. This wall is provided with perforations 8 through which the oil contained within the clutch casing is permitted to circulate. The outer clutch member C comprises a head 10 that is recessed for the reception of the intermediate clutch member, and has a frusto conical internal face, wherewith the adjacent face of the latter member is adapted to coöperate. The head 10 is carried upon the end of a hub 12 that is confined between the collar 1, and a thrust collar 13 that is secured to the shaft A, the outer clutch member C being free to rotate upon the shaft. The pulley B is mounted upon and locked to the hub 12 by any suitable means, as by a key 14.

15 represents a shell or casing that is internally threaded at one end, as shown at 16, for application to the externally threaded end, of the outer clutch member. The shell 15 is cylindrical throughout the greater portion of its length, but tapers toward the shaft at its end remote from the head 10, sufficient clearance being left between the shaft and the reduced end of the shell to accommodate the shifting sleeve 18, that is slidable upon the shaft. The purpose of this sleeve will be presently described.

The outer surface of the inner clutch member D is made to fit within the shell 6 of the intermediate clutch member, and the tapered end of the inner clutch member is provided with an inwardly extending flange 20 that is slidable upon the hub 5 of the intermediate clutch member. Extending radially from the end of the inner clutch member opposite the flange 20, are a pair of diametrically opposed lugs 21 which are confined each between a pair of ribs 22 that extend inward from the shell 15, thereby to lock the inner clutch member against rotation with respect to the shell. And it will now be explained also, that the shell is secured against rotation upon the outer clutch member C by means of a locking screw 23.

The end of the inner clutch member nearest the reduced end of the casing 15, is internally threaded for the reception of an externally threaded cylindrical extension 24 of an adjusting ring or abutment member 25. This ring or abutment member, therefore, constitutes, in effect, an adjustable extension of the inner clutch member. It has already been explained that the inner clutch member is held against rotation with respect to the casing 15, through the coöperation of the lugs 21 of the former with the ribs 22 of the latter; and it will now be explained that the adjusting ring 25 is held against rotation with respect to the casing, and therefore with respect to the inner clutch member, by a screw 26 that is threaded through the casing and has a tapered inner end for the occupancy of any one of the notches 27 that is formed in the periphery of the ring 25 (see Fig. 3). A pair of projections 30 extend from the right hand side of the adjusting ring 25, as the same is viewed in Figs. 1 and 2, and the outer faces of these projections are slightly under cut adjacent the body of the ring, to produce recesses which have a purpose that will be brought out during the following description. A pair of diametrically opposed ears 31 project from the adjacent end of the sleeve 18, and these ears are of substantially the same width as the projections 30. A pin 32 extends transversely through each of the ears 31, and has journaled upon each of its ends, a link 33 that may be held against removal from the pin by having the end of the pin "upset" or riveted. A pin 34 is supported by and between the free ends of the links 33, and journaled upon, said pin is an antifriction roller 35.

A second pair of links 36 are pivoted upon the ends of the pin 34, and between the opposite ends of these, is journaled a roller 37, upon a pin 38. It will be observed from Figs. 1 and 2, that the rollers 37 occupy an annular groove 40 that is formed within the inner surface of the reduced end of the casing 15. Two or more of these clutch actuating mechanisms comprising the aforesaid rollers and links, may be employed, the number required depending somewhat upon the size and power of the clutch. In any case, they should be located at equal distances apart, and for convenience I have shown two in connection with the embodiment herein illustrated, and have located them diametrically opposite each other.

A groove 41 surrounds the exposed part of sleeve 18, leaving between said groove and the adjacent end of said sleeve an annular ridge 42 whereon the usual collar 43 is mounted, said collar having trunnions 44 for coöperation of the shifting apparatus, indicated conventionally at 45. The sleeve 18 may be provided with any desired number of holes 46, one of said holes being shown in Figs. 1 and 2. A port 47 extends longitudinally through the wall of the sleeve 18, from its inner end to the hole 46, for a purpose which will be described farther along.

A screw 49 is used to close an opening 50 that extends through the reduced end of the casing 15 adjacent the aperture through which the sleeve 18 reciprocates. When it is desired to fill the clutch casing with oil, the screws 49 and 26 are removed, and oil is poured through the hole vacated by the screw 26, until it overflows through the hole 50, it being understood that the parts are turned in the position shown in Figs. 1 and 2, during this operation. Thereafter, the screws may be replaced to retain the oil within the casing.

An inside peripheral flange 51 surrounds the aperture of the reduced end of the casing 15 and forms a gutter which arrests the flow of oil down along the surface of the casing toward the sleeve 18, the oil flowing from the highest point of the gutter down both sides of the clutch until it is deposited in the lower portion of the casing. A similar gutter 52 is formed upon the inner annular wall of the head 10. This gutter not only serves to return excess oil to the bottom of the casing, but it also supplies oil to the ports 53 which lead to a lubricant cavity 54 within the hub 12, thereby very effectually oiling the bearing of the driven clutch member upon the shaft.

In the use of the clutch, the clutch members are moved into engagement by shifting the sleeve 18 inward, thereby forcing the rollers 35 outward along the surface of the adjusting ring through the intervention of the links 33, and, in so doing, the pairs of the links 36 are straightened out into parallelism with each other, between the opposed walls of the casing 15 (which, it will be remembered, is rigidly connected to the outer clutch member C) and the adjusting ring 25 (which it will also be recalled, is, in effect, a part of the inner clutch member). Therefore, the inner and outer clutch members are moved relatively toward each other, and into firm engagement with the intermediate clutch member. As a matter of fact, the outer clutch member does not move longitudinally upon the shaft, but the inner clutch member is moved toward and picks up the intermediate clutch member and presents it to the outer clutch member. From this it will be seen that the first, frictional or yielding connection between the driving and driven elements is through the intermediate and inner clutch members, and this results in a gradual initial movement being imparted to the driven element. This, of course, increases and becomes more positive as the outer clutch member is engaged by the intermediate clutch member, and the films of oil between the faces of the clutch members are "broken down" and eliminated. To disengage the clutch members, the foregoing operation is reversed. Upon sliding the sleeve 18 outward, the rollers 35 are drawn into the recesses in the outer faces of the projections 30, thereby positively connecting the inner clutch member (through the adjusting ring 25) with the sleeve 18, wherefore, the inner clutch member is positively withdrawn from engagement with the intermediate clutch member.

In the reciprocation of the sleeve 18, if a suitable vent were not provided for the casing, the compression of air within the casing by the inward movement of the inner end of the sleeve would result in oil being forced out between the adjacent surfaces of the sleeve and casing, and between the sleeve and the shaft. The necessary vent is provided by the previously mentioned bore 47 which extends from the inner end of the sleeve to one of the holes 46. Therefore, when the sleeve is moved inward, the air within the casing is permitted to escape through the bore 47 and hole 46.

Now, when it is desired to adjust the clutch to compensate for wear, or to regulate it when it is originally assembled in order to secure proper coöperation between the clutch members, the screw 26 is removed and the adjusting ring 25 is rotated in an appropriate direction to accomplish the desired adjustment between the clutch members. The turning of the ring 25 is very conveniently accomplished by inserting a pin into any of the holes 46 of the sleeve 18 and turning said sleeve, thereby turning the ring because of the fact that the ring and sleeve are locked together by the links 33 which are secured to the ears 31 of the sleeve, and straddle the projections 30 of the ring. When the proper adjustment between the clutch members is obtained, the screw 26 is returned to its normal position with its tapered end within one of the notches 27 of the ring. By reason of the fact that the links 36 assume an angle perpendicular to the opposed surfaces wherewith their rollers engage when the clutch is in effective position, the clutch members are actually locked or blocked against separation; in other words, the well known condition, commonly referred to as "dead center" position, prevails. It is also clear from the foregoing that the centrifugal action of the clutch, when it is in operation, tends to hold these parts in effective position.

In Fig. 5 I have illustrated a method of connecting the casing 15 to the head 10, which I employ in connection with clutches that are so large as to render the screw-thread connection of the former modification impracticable. In this instance, the head is provided with a plurality of holes through which screws 55 freely pass. These screws are threaded into holes tapped into the end of the casing, and their heads 56 are countersunk within recesses in the head 10.

Having thus described my invention, what I claim is:

1. The combination with a driving and a driven element, of inner and outer conical clutch members non-rotatable with respect to one element, a conical clutch member intermediate the former clutch members and non-rotatable with respect to the other element, said intermediate clutch member being provided with a hub within its inclined face, the inner conical clutch member being slidable on said hub and means for moving said clutch members toward and from each other.

2. The combination of a cylindrical casing having a clutch face at one end and an abutment at the other end, a shiftable clutch member within said casing and non-rotatable with respect thereto, an intermediate clutch member between said clutch face and member and adapted to be gripped thereby, an abutment member adjustably secured to said shiftable clutch member and shiftable therewith within the casing, and means between said abutments to move the same toward and from each other.

3. The combination with a driving and a driven element, of a pair of clutch members non-rotatable with respect to one element, a clutch member intermediate the former clutch members and non-rotatable with respect to the other element, an abutment carried by each of the aforesaid pair of clutch members, said abutments being opposed to each other and inversely arranged as compared to the arrangement of the clutch faces of said members, wherefore a separation of the abutments will cause the clutch members to be moved relatively toward each other, one of said abutments having a recess that opens toward the other abutment, means bearing within said recess and that is adapted to be wedged between the opposed abutments, and mechanism for actuating said means.

4. The combination with a driving and a driven element, of a pair of clutch members non-rotatable with respect to one element, a clutch member intermediate the former clutch members and non-rotatable with respect to the other element, an abutment carried by each of the aforesaid pair of clutch members, said abutments being opposed to each other and inversely arranged as compared to the arrangement of the clutch faces of said members, wherefore a separation of the abutments will cause the clutch members to be moved relatively toward each other, one of said abutments being adjustable relative to the clutch face of its respective member, and the other abutment having a recess that opens toward the former abutment, means bearing within said recess and that is adapted to be wedged between the opposed abutments, and mechanism for actuating said means.

5. The combination with a driving and a driven element, of a pair of clutch members non-rotatable with respect to one element, a clutch member intermediate the former clutch members and non-rotatable with respect to the other element, an abutment member having a screw threaded connection with one of the clutch members of the aforesaid pair whereby the abutment surfaces thereof may be adjusted toward and from the clutch face of the respective clutch member, an abutment carried by the other of the aforesaid pair of members and having an annular groove that is opposed to the abutment surface of the first mentioned abutment member, said abutment members being arranged inversely as compared with the arrangement of the clutch faces of the members wherewith they have connection, means bearing within the aforesaid groove and adapted to be wedged between the opposed abutment members thereby to move the aforesaid clutch faces toward each other, said means being confined against any but radial movement with respect to the first mentioned abutment member, and mechanism for actuating said means.

6. The combination with a driving and a driven element, of a pair of clutch members non-rotatable with respect to one element, a clutch member intermediate the former clutch members and non-rotatable with respect to the other element, an abutment member having a screw threaded connection with one clutch member of the aforesaid pair whereby the same may be adjusted toward and from the clutch face thereof, a casing carried by the other of the aforesaid pair of clutch members and comprising an abutment member having an annular groove that opens toward the aforesaid abutment member, said abutment members being arranged inversely as compared with the arrangement of the clutch faces of the members wherewith they have connection, means that bears in said groove and that is capable of being wedged between the same and the opposed surface of the other abutment member, thereby to move the aforesaid clutch faces toward each other, the last mentioned abutment member having a portion for coöperation with said means whereby the same is held against any but radial movement with respect thereto, and mechanism for actuating said means.

7. The combination with a driving and a driven element, of a pair of clutch members non-rotatable with respect to one element, a clutch member intermediate the former clutch members and non-rotatable with respect to the other element, an abutment member having screw threaded connection with one clutch member of the aforesaid pair whereby the same may be adjusted toward and from the clutch face thereof, a casing member carried by the other of the aforesaid pair of clutch members and comprising an abutment having an annular groove that opens toward the aforesaid abutment member, said abutment members being arranged inversely as compared with the arrangement of the clutch faces of the members wherewith they have connection, means that bears within the aforesaid groove and that is capable of being wedged between the same and the opposed surface of the other abutment member, thereby to move the aforesaid clutch faces toward each other, and mechanism for operating said means, the first mentioned abutment member having a portion for coöperation with said mechanism to hold the mechanism and the aforesaid means against relative angular movement with respect to said abutment member, said mechanism being adapted to coöperate with said portion for moving the abutment members toward each other when the aforesaid means is in ineffective position.

8. The combination with a driving and a driven element, of a pair of clutch members non-rotatable with respect to one element, a clutch member intermediate the former clutch members and non-rotatable with respect to the other element, an abutment member having screw threaded connection with one of the clutch members of the aforesaid pair whereby the same may be adjusted toward and from the clutch face thereof, a casing carried by the other clutch member of the aforesaid pair and inclosing the other clutch members and the abutment member, said casing comprising a second abutment member having an annular groove that opens toward the aforesaid abutment member, said abutment members being arranged inversely as compared with the arrangement of the clutch faces of the members wherewith they have connection, the first abutment member having a projection that extends toward the second abutment member, a roller that is adapted to bear in the aforesaid groove, a second roller that is adapted to traverse the opposed surface of the first abutment member, a pin whereon each roller is journaled, links connecting said pins, a pair of links connected to the journal pin of the roller which traverses the abutment member, said links being spaced apart to receive between them the projection of the abutment member, and means for moving the last mentioned roller outward until the first mentioned links assume an angle substantially perpendicular to the surfaces of the abutment members, or for moving said roller inward for coöperation with the aforesaid projection, said projection having a recess in its outer face for the reception of said roller.

9. In a clutch of the character described, the combination of a supporting collar that is adapted to be secured to a shaft, a thrust collar spaced from the first mentioned collar, an outer clutch member having a hub portion which is confined between the aforesaid collars and having a head which overhangs the supporting collar, said head being provided with a frusto conical inner wall, an intermediate clutch member comprising a frusto conical shell and a hub extension that is supported by and slidable upon the supporting collar, means for preventing rotation between the intermediate clutch member and the supporting collar, an inner clutch member having an outer frusto conical face for engagement with the inner surface of the intermediate clutch member and having a portion slidable upon the hub of said intermediate clutch member, an adjusting ring having a screw threaded connection with the inner clutch member and having its periphery provided with a series of notches, a casing carried by the outer clutch member and inclosing the other clutch members and the adjusting ring, said casing having a wall that is provided with an annular groove which opens toward the adjusting ring, said ring having a projection which extends toward the aforesaid wall, the projection having a recess in its surface remote from the shaft, the casing and the inner clutch member having interlocking portions whereby said clutch member is movable longitudinally of the casing but is held against rotation with respect thereto, a member extending through the casing and having a portion which occupies one of the peripheral notches of the abutment member whereby said member is also held against rotation with respect to the casing, a roller which occupies the aforesaid groove, a second roller which is adapted to traverse the opposed surface of the adjusting ring, a pin whereon each of the rollers is journaled, links connecting said pins, a pair of links connected to the pin whereon the second mentioned roller is journaled which links are spaced apart to receive between them the aforesaid projection of the abutment member, and a sleeve slidable upon the shaft and having pivotally connected to it the inner ends of the last mentioned links.

10. A clutch of the character described comprising a substantially oil-tight casing that incloses the working parts of the clutch, said casing being adapted to be mounted upon a shaft and consisting of a substantially cylindrical wall and end walls which approach said shaft, said end walls being provided with annular gutters that surround the apertures through which the shaft extends thereby to collect the oil which flows down the end walls of the casing and divert it about said apertures and deliver it into the lower portion of the casing, said casing having a filling opening and a gage opening that are located on opposite sides of the casing, the former being spaced a greater distance from the center of the casing than the latter, and means for closing said openings.

11. A clutch of the character described comprising a substantially oil-tight casing that incloses the working parts of the clutch, said casing being adapted to be mounted upon a shaft and consisting of a substantially cylindrical wall and end walls which approach said shaft, said end walls being provided with annular gutters that surround the apertures through which the shaft extends thereby to collect the oil which flows down the end walls of the casing and divert it about said apertures and deliver it into the lower portion of the casing, said casing having an oil duct that leads from one of said gutters to its bearing upon the shaft.

12. In a clutch of the character described, the combination with a driving and a driven element, one of said elements constituting a shaft, of a substantially oil-tight casing mounted upon said shaft and comprising a substantially cylindrical wall and end walls which approach said shaft, clutch members within said casing, mechanism within said casing for engaging and disengaging said clutch members, and a sleeve slidable upon the shaft through an aperture in one of the end walls of the casing, said sleeve having connection with the aforesaid mechanism and being provided with a vent port which opens at one end within the casing, and at its opposite end without the casing when the sleeve is in any but its extreme inner position.

13. The combination of a pair of clutch members nonrotatable with respect to each other, a clutch member intermediate the former clutch members, the pair of clutch members having opposed portions which are inversely arranged as compared to the arrangement of their clutch faces, one of said portions having a recess which opens toward the other portion, rollers within said recess, links pivotally supported at one end by said rollers, rollers carried by the opposite ends of the links, and means for straightening out said links between the aforesaid opposed portions thereby to separate the portions and move the clutch faces of the aforesaid pair of members into engagement with the intermediate clutch member.

In testimony whereof, I hereunto affix my signature in the presence of two witnesses.

WILLIAM A. HEANEY.

Witnesses:
BRENNAN B. WEST,
C. B. MITCHELLA.